US012277843B2

(12) United States Patent
Julien

(10) Patent No.: US 12,277,843 B2
(45) Date of Patent: Apr. 15, 2025

(54) COMPUTER VISION SYSTEM AND METHODS FOR ANOMALOUS EVENT DETECTION

(71) Applicant: Tyco Fire & Security GmbH, Neuhausen am Rheinfall (CH)

(72) Inventor: Matthew Julien, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 460 days.

(21) Appl. No.: 17/580,330

(22) Filed: Jan. 20, 2022

(65) Prior Publication Data

US 2023/0230465 A1 Jul. 20, 2023

(51) Int. Cl.
*G08B 13/196* (2006.01)
*G06V 10/25* (2022.01)
(Continued)

(52) U.S. Cl.
CPC ....... *G08B 13/19608* (2013.01); *G06V 10/25* (2022.01); *G06V 20/52* (2022.01);
(Continued)

(58) Field of Classification Search
CPC .............. G08B 13/00; G08B 13/19608; G08B 13/19606; G08B 13/19613;
(Continued)

(56) References Cited

U.S. PATENT DOCUMENTS

2004/0228503 A1\* 11/2004 Cutler .................... G06V 40/25
382/103
2005/0104959 A1 5/2005 Han et al.
(Continued)

FOREIGN PATENT DOCUMENTS

WO 2005050581 A2 2/2005

OTHER PUBLICATIONS

Harris, Elsa J et al. "A Survey of Human Gait-Based Artificial Intelligence Applications." Frontiers in robotics and AI vol. 8 749274. Jan. 3, 2022, doi:10.3389/frobt.2021.749274 (Year: 2022).\*
(Continued)

*Primary Examiner* — Andrae S Allison
*Assistant Examiner* — Emmanuel Silva-Avina
(74) *Attorney, Agent, or Firm* — ArentFox Schiff LLP

(57) ABSTRACT

Disclosed herein are an apparatus, method, and computer-readable medium for detecting an anomalous behavior event for an environment and transmitting an alert of the event. An implementation may comprise detecting, in a plurality of image frames captured by a camera, when a person enters a region of interest, tracking movements of the person in the region of interest by comparing images of the person in the plurality of image frames, determining attributes of the person, determining environmental contexts for the region of interest, determining whether or not an anomalous behavior is detected based on the movements and the attributes of the person and the environmental contexts, generating an alert when the anomalous behavior is detected, and transmitting the generated alert to user devices of one or more predetermined recipients.

22 Claims, 5 Drawing Sheets

(51) Int. Cl.
*G06V 20/52* (2022.01)
*G06V 40/20* (2022.01)

(52) U.S. Cl.
CPC ....... *G06V 40/25* (2022.01); *G08B 13/19656* (2013.01); *G08B 13/19691* (2013.01)

(58) Field of Classification Search
CPC .......... G08B 13/19656; G08B 13/1966; G08B 13/19669; G08B 13/19673; G08B 13/19691; G06V 10/255; G06V 40/23; G06V 2201/05; G06V 10/25; G06V 20/52; G06V 40/20; G06V 40/25
USPC ....................................................... 382/103
See application file for complete search history.

(56) References Cited

U.S. PATENT DOCUMENTS

| | | | | |
|---|---|---|---|---|
| 2021/0241468 | A1* | 8/2021 | Zhang | G06T 7/246 |
| 2021/0391089 | A1* | 12/2021 | Eswara | G06V 20/53 |
| 2022/0114839 | A1* | 4/2022 | Qiu | G06V 10/34 |
| 2022/0342989 | A1* | 10/2022 | Bunker | G06V 40/25 |

OTHER PUBLICATIONS

International Search Report issued in corresponding International Application No. PCT/US2023/060247 dated Apr. 11, 2023.

* cited by examiner

COMPUTER VISION SYSTEM AND METHODS FOR ANOMALOUS EVENT DETECTION

TECHNICAL FIELD

The described aspects relate to security systems, including a computer vision system, having features configured to detect an anomalous event.

BACKGROUND

Human beings analyze their environment continuously and ascertain whether or not an abnormal situation exists in their environment. An anomalous event associated with anomalous behavior of a person is often defined based on both the behavior itself and the environment in which the behavior is observed. For example, seeing a person jogging in a park would not be considered anomalous. However, if a person observes someone running through a hospital hallway, the person would assume there is some type of abnormal situation, e.g., a medical emergency. This distinction is made based on learning about our environment and processing massive amounts of information based on experience. Suppose now the environment is being observed by a computing system, e.g., using any number of cameras, instead of a human being. The computing system processes the information based on rules. However, the computing system often misinterprets what is being observed. In some cases, alerts are raised unnecessarily. In other cases, abnormal scenarios are missed.

Conventional systems often fail to provide timely detection and timely recognition of anomalous behavior for a given environment. Thus, alerts may be delayed, anomalous behavior events may not be recognized as being emergencies, etc. Accordingly, there exists a need for improvements in computing systems with respect to detections of anomalous behavior events in an environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to computer vision systems that may be used for intervention when anomaly occurs, and more particularly to detection of an anomalous behavior event in an environment.

An example implementation includes a method for detecting anomalous behavior and transmitting an alert, the method comprising: detecting, in a plurality of image frames captured by a camera, when a person enters a region of interest, tracking movements of the person in the region of interest by comparing images of the person in the plurality of image frames, determining attributes of the person, determining environmental contexts for the region of interest, determining whether or not an anomalous behavior is detected based on the movements and the attributes of the person and the environmental contexts, generating an alert when the anomalous behavior is detected, and transmitting the generated alert to user devices of one or more predetermined recipients.

In one alternative or additional aspect, to determine whether or not the anomalous behavior is detected includes to determine whether a detected body position of the person is different from a threshold body position of persons in the region of interest.

In one alternative or additional aspect, to determine whether or not the anomalous behavior is detected includes to determine whether a gait of the person is different from a threshold gait of persons in the region of interest.

In one alternative or additional aspect, the alert comprises at least one of: an SMS message to a mobile device of the recipient, an email message sent to a user endpoint device of the recipient, or a message sent to a controller of the environment.

In one alternative or additional aspect, the environmental contexts include at least one of: a location, type of the location, a weather condition at the location, an existence of a special event during a time at which the image frames are captured by the camera, and a time of day.

In one alternative or additional aspect, the attributes of the person include at least one of: an activity being performed by the person, a category of the person, an anatomical position of a body of the person, an object on the person, and an object near the person.

In one alternative or additional aspect, the environmental contexts are received from another system.

In one alternative or additional aspect, a predetermined recipient of the one or more predetermined recipients comprises at least one of: an operator of the vision system, security personnel, and emergency personnel.

In one alternative or additional aspect, wherein the alert is configured to control another device.

In one alternative or additional aspect, the controlling another device includes at least controlling door locks or lighting equipment based on a type of the alert.

In one alternative or additional aspect, the alert comprises at least one of: a Short Message Service (SMS) message to a mobile device of the recipient, an email message sent to a user endpoint device of the recipient, or a message sent to a controller of the environment.

In one alternative or additional aspect, to determine whether or not the anomalous behavior is detected comprises to determine based on a learning algorithm.

In one alternative or additional aspect, the alert is sent in an Hypertext Transfer Protocol Secure (HTTPS) or Message Queue Telemetry Transport (MQTT) format via a cloud network.

In one alternative or additional aspect, further comprising the camera configured to capture the plurality of image frames of an environment.

In one alternative or additional aspect, the method comprises: storing, in the memory, at least one of: locations of cameras, unique identifiers of cameras, associations of cameras, respective unique identifiers and locations, environmental contexts, models for categorizing people based on attributes, timestamps of anomalous behavior detection events, and the plurality of image frames captured during a predetermined capture period of the anomalous behavior detection event.

Another example implementation includes an apparatus for detecting anomalous behavior and transmitting an alert, comprising a memory storing instructions and a processor communicatively coupled with the memory and configured to: detect, in a plurality of image frames captured by a camera, when a person enters a region of interest, track movements of the person in the region of interest by comparing images of the person in the plurality of image frames, determine attributes of the person, determine environmental contexts for the region of interest, determine whether or not an anomalous behavior is detected based on the movements and the attributes of the person and the environmental contexts, generate an alert when the anomalous behavior is detected, and transmit the generated alert to user devices of one or more predetermined recipients.

Another example implementation includes an apparatus for detecting anomalous behavior and transmitting an alert, comprising means for detecting, in a plurality of image frames captured by a camera, when a person enters a region of interest. The apparatus further includes means for tracking movements of the person in the region of interest by comparing images of the person in the plurality of image frames. The apparatus further includes means for determining attributes of the person. The apparatus further includes means for determining environmental contexts for the region of interest. The apparatus further includes means for determining whether or not an anomalous behavior is detected based on the movements and the attributes of the person and the environmental contexts. The apparatus further includes means for, when the anomalous behavior is detected, generating an alert. The apparatus further includes means for transmitting the generated alert to user devices of one or more predetermined recipients.

Another example implementation includes a computer-readable medium (e.g., a non-transitory computer-readable medium) for detecting anomalous behavior and transmitting an alert, instructions executable by a processor to detect, in a plurality of image frames captured by a camera, when a person enters a region of interest, and track movements of the person in the region of interest by comparing images of the person in the plurality of image frames. The instructions are further executable to determine attributes of the person. The instructions are further executable to determine environmental contexts for the region of interest. The instructions are further executable to determine whether or not an anomalous behavior is detected based on the movements and the attributes of the person and the environmental contexts. The instructions are further executable to generate an alert when the anomalous behavior is detected. The instructions are further executable to transmit the generated alert to user devices of one or more predetermined recipients.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
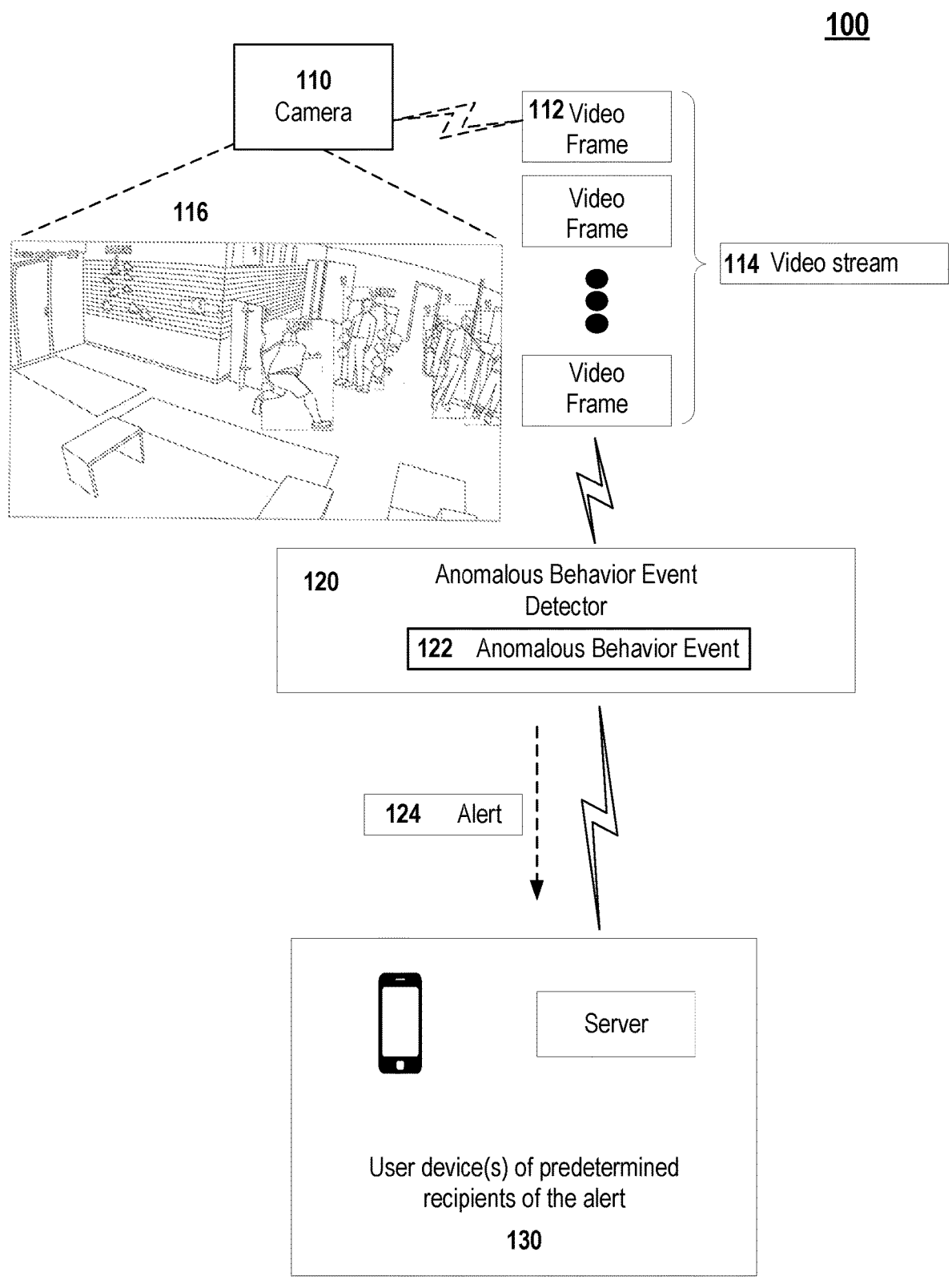
FIG. 1 is a diagram of a system for detecting anomalous behavior in an environment, in accordance with exemplary aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Vision systems may be used to detect a person in an environment and track the person within a region of interest. In some implementations, for example, vision systems may include object detection and tracking capabilities. For instance, in some cases, the object may be a person, and the object tracking may be used for determining when a person is exhibiting an abnormal behavior or action, also referred to herein as an anomalous behavior event. Detection of abnormal or anomalous behavior is important for fields such as security, injury prevention, reduction of financial liability, reduction of damage to reputation of an institution, etc. For example, a user of a security system may be interested in knowing when people enter and exit a region of interest wearing abnormal clothing for a season, which may be an indicator of an anomalous or suspicious behavior. A camera (such as an Internet Protocol (IP) camera) may be used to monitor the region of interest, track people as they traverse in and out of the region of interest, and detect when a person behaves abnormally. If an anomalous behavior event is detected within an area being monitored, and alert is generated and transmitted, which may lead to timely intervention that may assist in reducing injury, liability, etc. For example, an action might be taken based on the alert.

The present disclosure includes apparatuses and methods that detect an anomalous behavior event for an environment and transmit an alert to one or more user devices of one or more predetermined recipients. In one aspect, the method is based on the environment being defined by an operator of the vision system. The operator of the vision system may annotate accordingly via a user interface, e.g., a graphical user interface (GUI) being used for setting up the vision system, e.g., a surveillance system used to monitor an environment. Thus, the environment to be captured by a given camera is annotated by the operator of the vision system via a GUI. Then, the vision system monitors the environment to determine when a person enters the environment and an anomalous behavior event for the environment is detected. For instance, in one aspect, the system is configured to determine whether a detected body position is different from a threshold or average or historical body position of a person in the environment, and/or if a gait of a person in the environment is different from a threshold or average or historical gait of a person in the environment.

When the anomalous behavior event is detected, the method transmits (e.g., via a wired or wireless communication channel) an alert to one or more user devices of one or more predetermined recipients. For example, a store may have a vision system including any number of cameras for monitoring different parts of the store. For each camera, the region of interest may be the full frame that can be captured by the camera. For example, if a person enters the environment appearing abnormal for the environment or exhibits a behavior abnormal for the environment, the alert may be sent to predetermined recipients, such as devices of security personnel. The alert may comprise an email, a text message, etc., sent to a cell phone, server, computer device, etc.

FIG. 1 is a diagram of a system 100 for detecting an anomalous behavior event. The system comprises a camera 110 (e.g., an internet protocol (IP) camera) configured to capture one or more video frames 112, such as in a video stream 114, of an environment 116, an anomalous behavior event detector 120 configured to detect an anomalous behavior event 122 in the one or more video frames 112, and generate and transmit an alert 124 to one or more alert recipients 130 (e.g., a server, user device). In an aspect, the environment 116 may be any indoor and/or outdoor area, such as an area associated with a building or store implementing a security system including the computer vision system as described herein.

The communication between the anomalous behavior event detector 120 and the user device associated with the predetermined recipient 130 may be performed via a communication network (Internet, cellular and/or WiFi network, enterprise network, or any other standard network). In some aspects, the anomalous event detector 120 may be implemented as a module of the camera 110 or on another device (e.g., computer device, server) communicatively coupled to the camera 110 for receiving video streams from the camera 110. The video stream 114 typically includes a plurality of video frames 112. For example, the camera may capture 30 frames per second. Then, for each second, the video stream 114 includes the 30 captured video frames 112.

Figure 2:
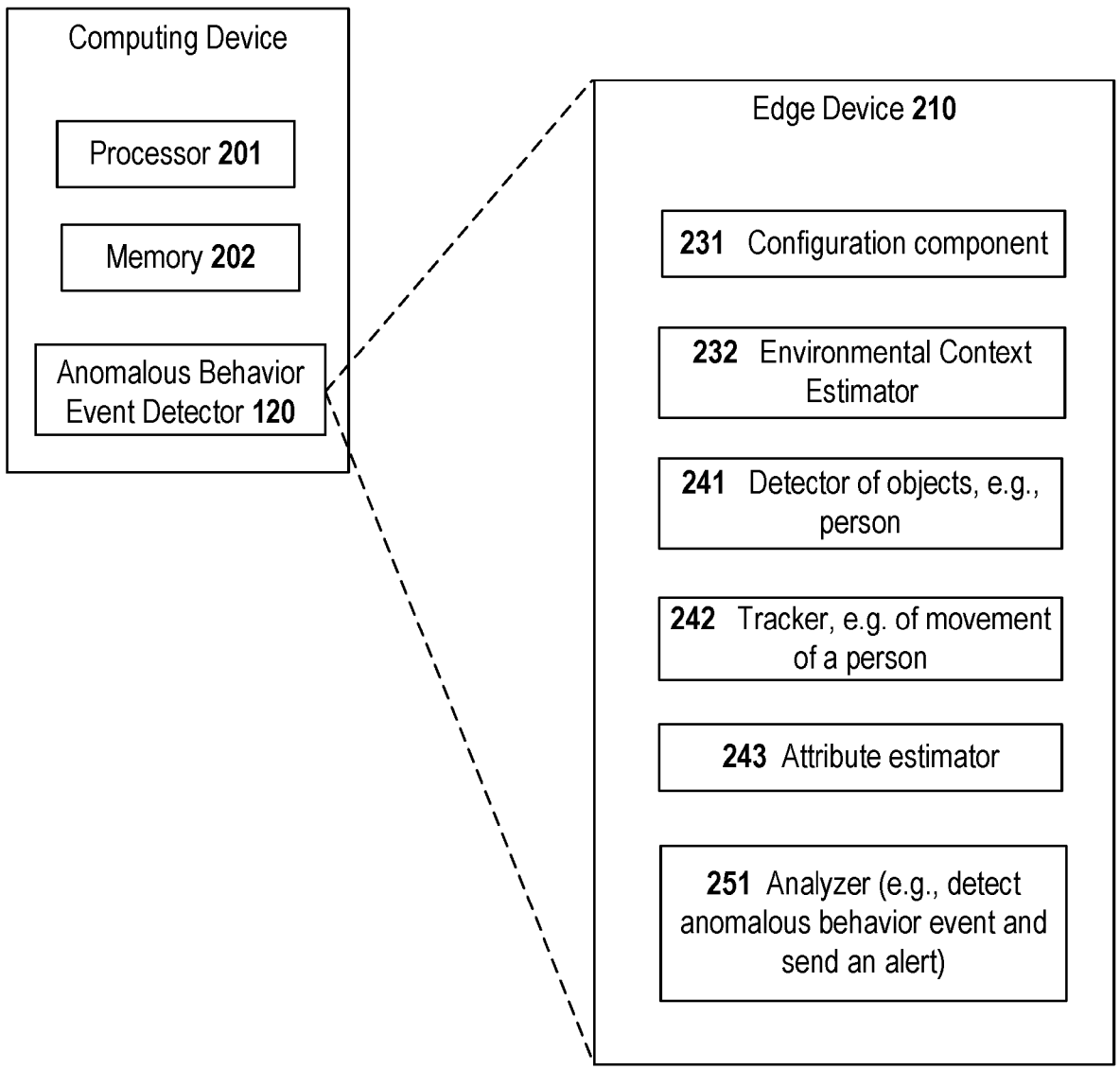
FIG. 2 is a block diagram of a computing device for detecting anomalous behavior, in accordance with exemplary aspects of the present disclosure.

FIG. 2 is a block diagram of an example computing device 200 including a processor 201 and/or a memory 202 operable to execute the anomalous behavior event detector 120 for detecting an anomalous behavior event. For example, the computing device 200 may be implemented as an edge device, e.g., as a part of the camera 110, or the computing device 200 can be separate from, but in communication with, the camera 110. For instance, the components of the computing device 200 can be in a server in communication with the camera 110 or a wireless or wired network.

The anomalous behavior event detector 120 may include:
a configuration component 231 for configuring a region of interest (an environment) to be captured,
an environmental context estimator 232 for estimating the environmental contexts (attributes of the environment),
a detector 241 for detecting when a person enters the region of interest,
a tracker 242 for tracking movements of the person in the region of interest using the plurality of image frames,
attribute estimator 243 for determining attributes of the person, and
an analyzer 251 for determining whether or not an anomalous behavior event is detected based on the attributes of the person and the environmental contexts, and transmitting an alert when the anomalous behavior is detected.

In some aspects, a user of a vision system that includes computing device 200, e.g., security personnel, may configure any number of cameras 110 for capturing images of people as they traverse the environment 116. The computing device 200 configured to detect of the anomalous event may receive the environment to be monitored in a manual or automated manner. For example, a use-camera command line parameter may be used to designate viewing angles, image quality, data storage requirements, etc.

In one aspect, an operator of the system installs any sets up any number of cameras and uses the configuration component 231 of the computing device 200 for configuring each camera to capture images in the region of interest.

In one aspect, each camera in the environment is identified using a unique ID. For example, tor each camera, the setup may include assigning a unique ID to the camera, associating the camera with a location, and defining environmental context for the camera. Thus, the operator of the system may associate each particular camera with a respective location. Then, a mapping of the associations may be stored in a cloud server.

In one aspect, a setup application may be used for configuring the cameras, selecting environmental contexts, and storing the selected environmental contexts and configurations in a database.

In one aspect, a software is used for natural language processing to enable the user to input the environmental contexts in a normal (human) language. The software includes a Natural Language Processing (NLP) model for translating the human language to machine language thereby outputting machine executable instructions.

In one aspect, the environmental context may be estimated for an environment when the camera is being setup to capture images of the environment and stored in a database. When anomalous behavior events are to be detected based on the environmental contexts, the stored environmental contexts may then be retrieved.

In one aspect, the analyzer 251 may include one or more anomalous behavior event detection models, which may be accessed, for example, via a cloud network. These detection models receive input from many sources and improve their models overtime. That is, a learning algorithm may be used to improve the quality of the detection. For example, if environmental contexts are received from numerous nursing homes, then over time, the detection models may recognize a person sitting on the floor or laying horizontally on the floor as being indicators of anomalous events for nursing homes as a typical posture for the environment would be upright or walking. In contrast, children tend to sit on the floor and play. Therefore, data gathered from multiple schools and playgrounds would enable the detection model to recognize that, for a school or playground environment, sitting on the floor may not be an anomalous behavior event.

In one aspect, the environmental contexts include at least one of: location (e.g., from the location of the camera and the location of the person in relation to the location of the camera), type of location (store, hospital, street, office, etc.), weather at the location, existence of special events (holiday, concert, party), time of day (e.g., during a time when a facility is open for operation versus after hours). The environmental context applies to all individuals in the environment. For example, if there is a costume party, seeing a person in a mask is not abnormal. In another example, seeing someone wearing a heavy coat in the middle of summer or with dark shades inside a building for an extended length of time may be abnormal regardless of the person.

In one aspect, the environmental context may be received from another system. For example, the weather at a particular location may be received via a feed (e.g., a wired or wireless communication link) from a weather system, a national weather database, etc. In another example, national holidays, special events, etc. may be received from another system, newsfeed, etc.

The environmental context estimator 232 may then estimate the environmental context for a given location (e.g., based on the location of the camera, camera ID, and any number of information received about the environment from any number of sources). Such information about the environment may relate to typical attributes of a person, such as but not limited to body position of a person in the area, and/or a typical gait of a person, and/or typical clothing worn by a person in the area, etc. For example, the camera may determine such environmental information by capturing images in an area and identifying where a person is or is not likely to walk or run, and/or use raingear, and/or a winter coat, and/or a hat, and/or wear shorts, and/or wear dark glasses, etc. In another example, the environmental may be suitable for walking but not for running. In one aspect, the estimation of the environment context may be performed when the camera is being setup to capture images of the environment and stored in a database.

In one aspect, a detector 241 is used for detecting when a person enters the region of interest. For example, the detector 241 may include, but is not limited to, object detection models and/or algorithms that have been trained to recognize objects in images. Then, a tracker 242 is used to track movements of the person in the region of interest using the plurality of image frames. For example, the tracker 242 may include object tracking models and/or algorithms that are trained to follow a relative movement of an object across one or more frames. Then, the attribute estimator 243 uses the plurality of image frames for determining attributes of the person. For example, the attribute estimator 243 may include object attribute models and/or algorithms that are trained to identify one or more features of an object.

In one aspect, the attributes of the person include at least one of: an activity being performed by the person (standing, sitting, laying down, crawling, sleeping, running, walking, playing, etc.), a category of the person (e.g., child versus adult), anatomical position of a body of the person (e.g., vertical position, horizontal position, bent down, and so on), an object on the person (e.g., a coat, glasses, masks, gloves, etc.), an object near the person (unattended object, bag, etc.).

Figure 3:
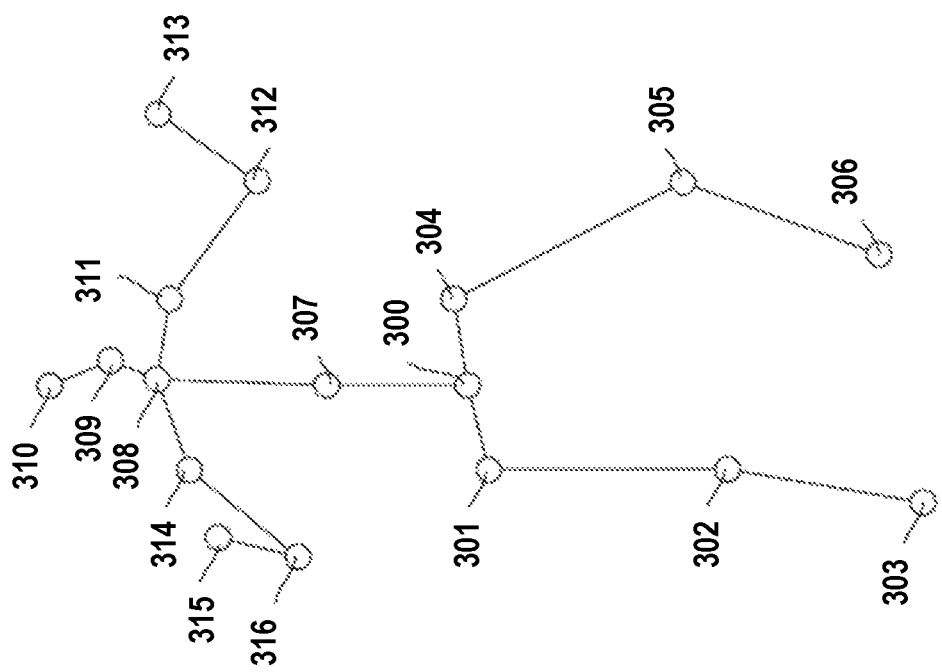
FIG. 3 is an example 3D model of a person suitable for determining the anatomical position of a body of a person, in accordance with exemplary aspects of the present disclosure.

FIG. 3 is an example 3D model of a person suitable for determining the anatomical position of a body of a person. The 3D model includes a bottom torso 300, left hip 301, left knee 302, left foot 303, right hip 304, right knee 305, right foot 306, center torso 307, upper torso 308, neck base 309, center head 310, right shoulder 311, right elbow 312, right hand 313, left shoulder 314, left elbow 315, and left hand 316. Thus, portions of the body are represented as dots and interconnections between the various portions of the body are shown as line segments. This 3D model is used to determine the pose of a person for differentiating between poses, e.g., bending, standing, walking, running, etc., as described below.

Figure 4:
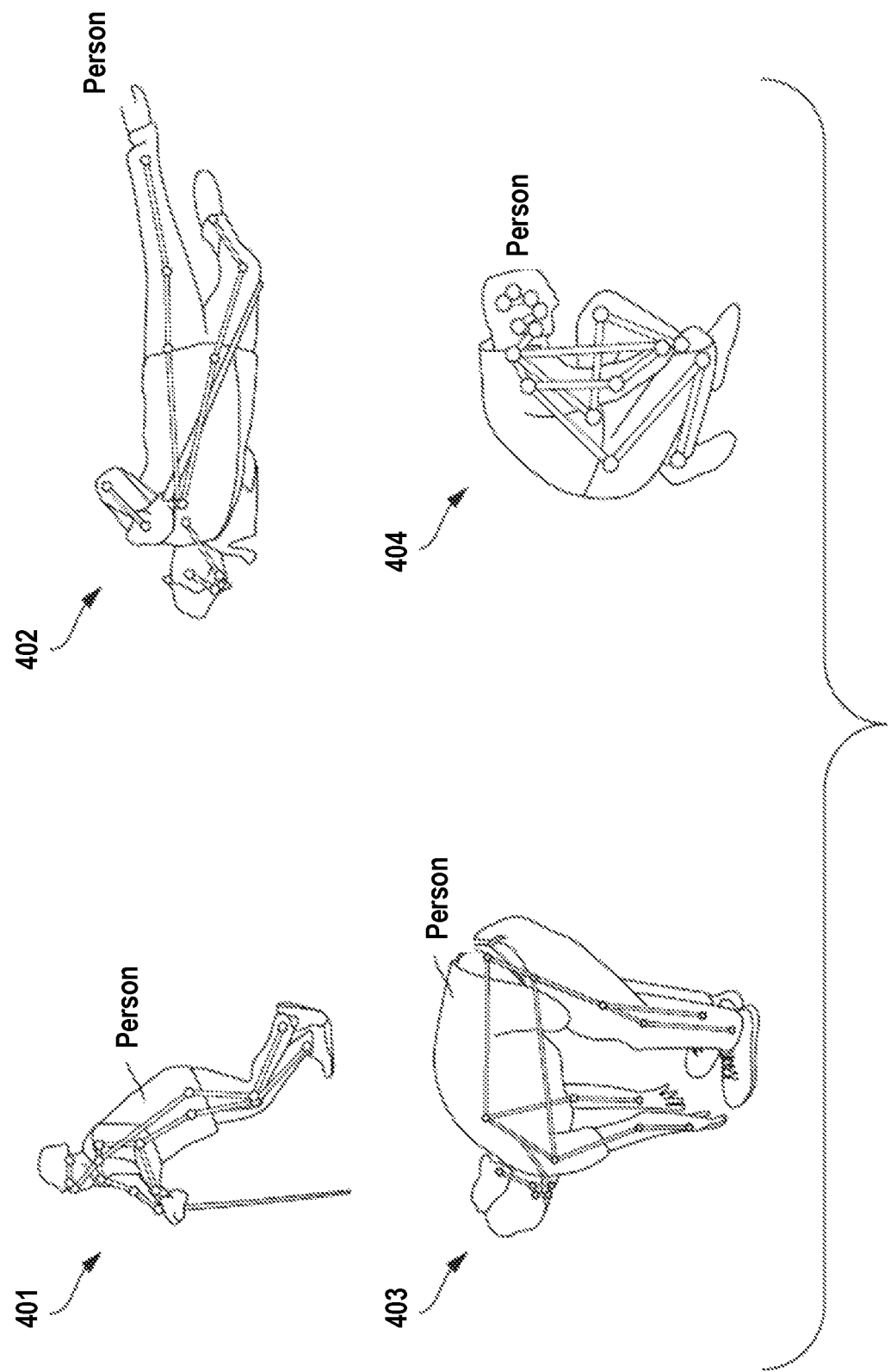
FIG. 4 is an example of a person in various anatomical positions, in accordance with exemplary aspects of the present disclosure.

FIG. 4 is an example of a person in various anatomical positions. For example, using the 3D model of FIG. 3, when the person is standing vertically, as shown in 401, the center head 310 is above the neck base 309. When the person is lying down, as shown in 402, the center head 310 is below the neck base 309. Moreover, in the lying down condition of 402, the other portions of the body are about the same distance from the ground. When the person is bending, as shown in 403, the right shoulder 311, right elbow 312, right hand 313, left shoulder 314, left elbow 315 and left hand 316 positions and left hip 301, left knee 302, left foot 303, right hip 304, right knee 305 right foot 306 positions are at about the same distance from the ground and make a specific pose indicative of the person bending down. There is also a particular set of body feature positions when the person may be simply bending over to tie their shoes, as shown in 404. Similar particular sets of body feature positions may be associated with a person walking or running and/or with a pattern of anatomical positions associated with walking or running, e.g., a gait of a person. The pose of the person may then be used to determine whether or not the behavior or the person is abnormal for the environment.

Then, in one aspect, an analyzer 251 is used for determining whether or not an anomalous behavior event is detected based on the attributes of the person and the environmental contexts, and for sending an alert when the anomalous behavior is detected. For example, the analyzer 251 may include one or more environment and/or person analysis models and/or algorithms that are trained to identify typical and/or not typical attributes of a person in an environment across one or more frames. For instance, in one aspect, the analyzer 251 is configured to determine whether a detected body position is different from a threshold or average or historical body position of a person in the environment, and/or if a gait of a person in the environment is different from a threshold or average or historical gait of a person in the environment, and/or if an article of clothing worn by a person is different from a threshold or average or historical article of clothing worn by a person in the environment.

In one aspect, the generated alert is sent to a predetermined recipient. For example, in an aspect, the computing device 200 may include a transmitter and/or other communication interface configured to transmit, e.g., via a wired or wireless network, a message including the alert to another computing device. In one aspect, the predetermined recipient may comprise a computing device of at least one of: an operator of the system, security personnel, emergency personnel (e.g., paramedics).

In one aspect, the generated alert is sent to the one or more predetermined recipients via a web app, a mobile app, etc. For example, the alert may be transmitted via a mobile push via a mobile application. For example, an operator or security personnel may receive the alert via his/her mobile device.

In one aspect, the alert may be for controlling another device. In one aspect, the controlling of the another device comprises the predetermined recipient taking an action (e.g., contacting personnel, turning-on lights (e.g., to increase visibility in the area of the abnormal event), locking/unlocking entry ways, etc.

In one aspect, the controlling of another device includes at least controlling door locks or lighting equipment. For example, door locks, lighting equipment, etc. may be controlled based on the existence of the alert and/or type of the alert. In one example, if the alert indicates that a person has fallen, more lights may be turned on. In another example, if a person is attempting to enter an area normally not accessible to public, door locks may be activated to prevent the person from accessing further areas or getting away prior to the arrival of security personnel. In yet another example, if the alert indicates additional air conditioning is needed, the control may be to increase airflow, cool down the room, etc.

In another aspect, the generation of the alert may cause the computing device to store the set of video frames associated with the detected anomalous behavior event.

Figure 5:
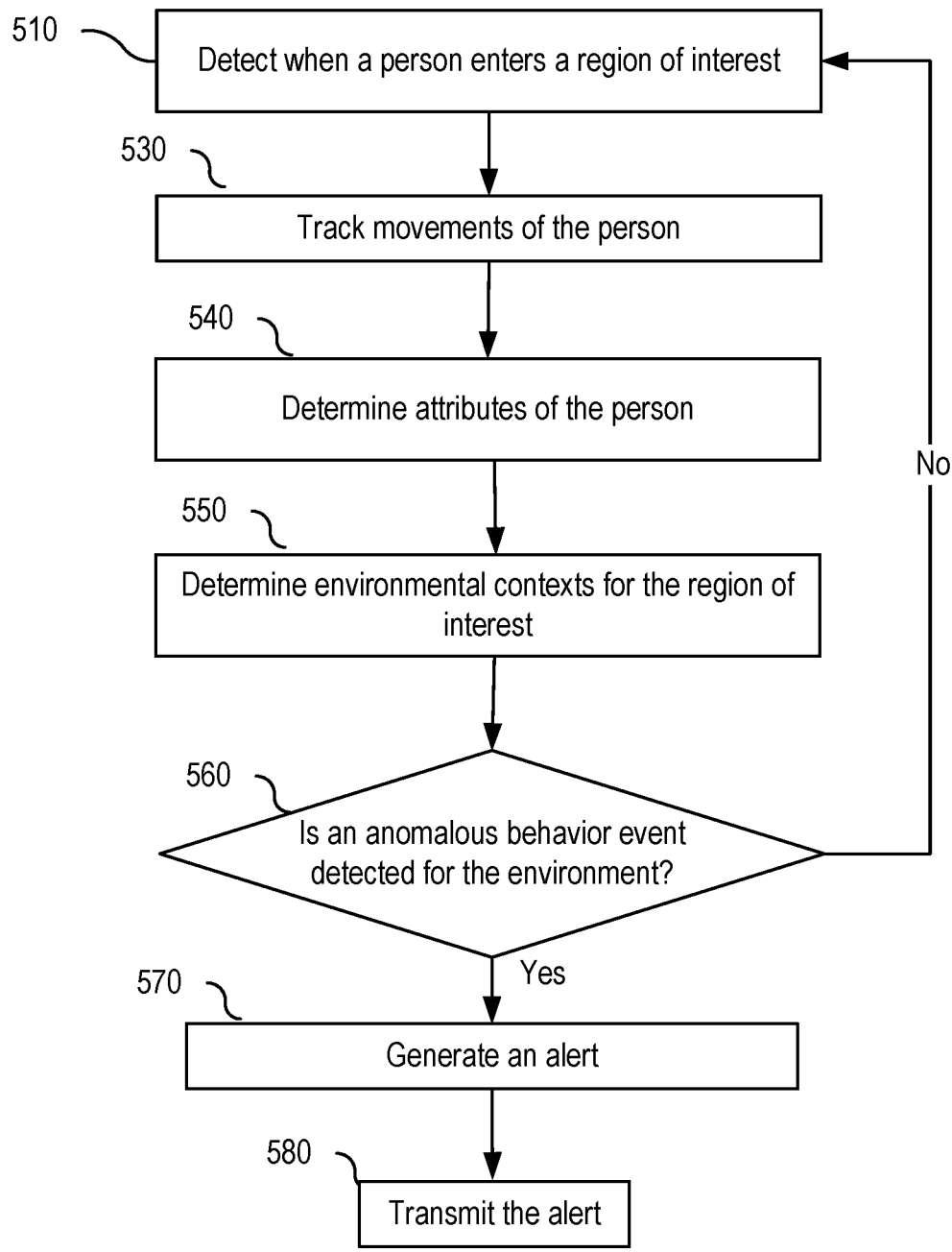
FIG. 5 is a flowchart illustrating a method for detecting an anomalous behavior event for an environment, in accordance with exemplary aspects of the present disclosure.

FIG. 5 is a flowchart illustrating a method 500 for detecting an anomalous behavior event for an environment.

In one aspect, referring to FIG. 2 and FIG. 5, in operation, computing device 200 may perform method 500 for detecting an anomalous behavior event by processor 201 and/or memory 202. In one aspect, the anomalous behavior event detector 120 is implemented in a camera (e.g., an IP camera) or a device, e.g., an edge device, communicatively coupled with the camera.

At block 510, the method 500, detects when a person enters a region of interest in a plurality of image frames captured by a camera. For example, in an aspect, the computing device 200, processor 201, memory 202, anomalous behavior event detector 120, and/or detector 241 may be configured to and/or may define means for detecting when a person enters a region of interest in a plurality of image frames captured by a camera. The region of interest may be the entire frame being captured by the camera or a portion of the frame, as set by the user. The person may be detected using an object detection software as known in the art and executed by the processor 201.

At block 530, the method 500 tracks the person using the plurality of image frames, e.g., using an object tracking software. For example, in an aspect, the computing device 200, processor 201, memory 202, anomalous behavior event detector 120, and/or tracker 242 may be configured to and/or may define means for tracking movements of the person in the region of interest using the plurality of image frames. Thus, as the person moves within the region of interest, the method tracks the person by comparing images of the person in a plurality of frames. The software used for detecting and tracking the person may be implemented together or separately in different components of the camera or by the computing device communicatively coupled with the camera. Moreover, the tracking of the person may be performed by the processor 201, e.g., executing tracking software as described above. For example, the tracker 242 may include object tracking models and/or algorithms that are trained to follow a relative movement of an object across one or more frames.

At block 540, the method 500 determines attributes of the person. For example, in an aspect, the computing device 200, processor 201, memory 202, anomalous behavior event detector 120, and/or attribute estimator 243 may be configured to and/or may define means for identifying one or more features of the person.

In one aspect, the attributes of the person include at least one of: an activity being performed by the person (standing, sitting, laying down, crawling, sleeping, running, walking, playing, etc.), a category of the person (e.g., child versus adult), an anatomical position of a body of the person (e.g., vertical position, horizontal position, bent down, and so on), an object on the person (e.g., a coat, glasses, masks, gloves, etc.), an object near the person (unattended object, bag, etc.).

At block 550, the method 500 determines environmental contexts for the region of interest. For example, in an aspect, the computing device 200, processor 201, memory 202, anomalous behavior event detector 120, and/or environmental context estimator 232 may be configured to and/or may define means for determining the environmental contexts for the region of interest. In one aspect, the environmental context is obtained from a database or a cloud network. In another aspect, the environmental context estimator 232 is used for estimating the environmental contexts (attributes of the environment).

At block 560, the method 500 determines whether or not an anomalous behavior is detected based on the attributes of the person and the environmental contexts. For example, in an aspect, the computing device 200, processor 201, memory 202, anomalous behavior event detector 120, and/or analyzer 251 may be configured to and/or may define means for determining whether or not an anomalous behavior is detected. For instance, in one aspect, the analyzer 251 may determine whether a detected body position is different from a threshold or average or historical body position of a person in the environment, and/or may determine whether a gait of a person in the environment is different from a threshold or average or historical gait of a person in the environment, and/or if an article of clothing worn by a person is different from a threshold or average or historical article of clothing worn by a person in the environment. When the anomalous behavior is detected, the method proceeds to block 570. Otherwise, the method proceeds to block 510.

At block 570, the method 500 generates an alert when the anomalous behavior is detected. For example, in an aspect, the computing device 200, processor 201, memory 202, anomalous behavior event detector 120, and/or analyzer 251 may be configured to and/or may define means for generating an alert when the anomalous behavior is detected. For instance, in one aspect, an Short Message Service (SMS) message, an email message, or a message for controlling the environment may be generated.

At block 580, the method 500 transmits the generated alert to user devices of one or more predetermined recipients. For example, in an aspect, the computing device 200, processor 201, memory 202, anomalous behavior event detector 120, and/or analyzer 251 may be configured to and/or may define means for transmitting the generated alert to one or more predetermined recipients, such as a computing device of at least one of: an operator of the system, security personnel, emergency personnel (e.g., paramedics).

In one aspect, the alert comprises at least one of: an SMS message to a mobile device of the recipient, an email message sent to a user endpoint device of the recipient, or a message sent to a controller of the environment.

In one aspect, the anomalous behavior event detection may use a learning algorithm to improve the accuracy of the detection.

In one aspect, the alert may be sent in Hypertext Transfer Protocol Secure (HTTPS) or Message Queue Telemetry Transport (MQTT) format. The other systems to which the alerts are sent may comprise systems of personnel performing actions based on the received alert. For instance, the alert listeners (personnel) may include listeners receiving text messages, sound alarms, displays on PVM, etc. Therefore, various types of end point devices may receive the alerts in various formats. As described above, the method of the present disclosure relies on what behavior, action, etc. is considered anomalous for the given environment. The environment to be captured and the associated environmental context may be annotated by a user (operator of the vision system) via a GUI interface.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vision system, comprising:
   a memory; and
   a processor communicatively coupled with the memory and configured to:
   detect, in a plurality of image frames captured by a camera, when a person enters a region of interest;
   track movements of the person in the region of interest by comparing images of the person in the plurality of image frames;
   determine attributes of the person;
   determine environmental contexts for the region of interest;
   determine whether or not an anomalous behavior is detected based on the movements and the attributes of the person and the environmental contexts;
   generate an alert when the anomalous behavior is detected; and
   transmit the generated alert to user device of one or more predetermined recipients via a communications channel of a communications network,
   wherein determining whether or not the anomalous behavior is detected includes determining whether a gait of the person is different from a threshold gait of persons in the region of interest.

2. The vision system of claim 1, wherein to determine whether or not the anomalous behavior is detected includes to determine whether a detected body position of the person is different from a threshold body position of persons in the region of interest.

3. The vision system of claim 1, wherein the environmental contexts include at least one of: a location, type of the location, a weather condition at the location, an existence of a special event during a time at which the image frames are captured by the camera, and a time of day.

4. The vision system of claim 1, wherein the attributes of the person include at least one of: an activity being performed by the person, a category of the person, an anatomical position of a body of the person, an object on the person, and an object near the person.

5. The vision system of claim 1, wherein the environmental contexts are received from another system.

6. The vision system of claim 1, wherein a predetermined recipient of the one or more predetermined recipients comprises at least one of: an operator of the vision system, security personnel, and emergency personnel.

7. The vision system of claim 1, wherein the alert is configured to control another device.

8. The vision system of claim 7, wherein the controlling another device includes at least controlling door locks or lighting equipment based on a type of the alert.

9. The vision system of claim 1, wherein the alert comprises at least one of: a Short Message Service (SMS) message to a mobile device of the recipient, an email message sent to a user endpoint device of the recipient, or a message sent to a controller of an environment near the camera.

10. The vision system of claim 1, wherein to determine whether or not the anomalous behavior is detected comprises to determine based on a learning algorithm.

11. The vision system of claim 1, wherein the alert is sent in an Hypertext Transfer Protocol Secure (HTTPS) or Message Queue Telemetry Transport (MQTT) format via a cloud network.

12. The vision system of claim 1, further comprising the camera configured to capture the plurality of image frames of an environment.

13. The vision system of claim 1, the processor being further configured to:
   store, in the memory, at least one of: locations of cameras, unique identifiers of cameras, associations of cameras, respective unique identifiers and locations, environmental contexts, models for categorizing people based on attributes, timestamps of anomalous behavior detection events, and the plurality of image frames captured during a predetermined capture period of the anomalous behavior detection event.

14. A method for detecting an anomalous behavior event for an environment by a vision system, comprising:
   detecting, by a processor and in a plurality of image frames captured by a camera, when a person enters a region of interest;
   tracking, by the processor, movements of the person in the region of interest by comparing images of the person in the plurality of image frames;
   determining, by the processor, attributes of the person;
   determining, by the processor, environmental contexts for the region of interest;
   determining, by the processor, whether or not an anomalous behavior is detected based on the movements and the attributes of the person and the environmental contexts;
   generating, by the processor, an alert when the anomalous behavior is detected; and
   transmitting, by the processor, the generated alert to user devices of one or more predetermined recipients via a communications channel of a communications network,
   wherein determining whether or not the anomalous behavior is detected includes determining whether a gait of the person is different from a threshold gait of persons in the region of interest.

15. The method of claim 14, wherein determining whether or not the anomalous behavior is detected includes determining whether a detected body position of the person is different from a threshold body position of persons in the region of interest.

16. The method of claim 14, wherein the environmental contexts include at least one of: a location, type of the location, a weather condition at the location, an existence of a special event during a time at which the image frames are captured by the camera, and a time of day.

17. The method of claim 14, wherein the attributes of the person include at least one of: an activity being performed by the person, a category of the person, an anatomical position of a body of the person, an object on the person, and an object near the person.

18. The method of claim 14, wherein a predetermined recipient of the one or more predetermined recipients comprises at least one of: an operator of the vision system, security personnel, and emergency personnel.

19. The method of claim 14, wherein the alert is configured to control another device.

20. The method of claim 19, wherein the controlling another device includes at least controlling door locks or lighting equipment based on a type of the alert.

21. The method of claim 14, wherein the alert comprises at least one of: a Short Message Service (SMS) message to a mobile device of the recipient, an email message sent to a user endpoint device of the recipient, or a message sent to a controller of the environment.

22. A non-transitory computer-readable medium storing instructions, for use by a vision system for detecting an anomalous behavior event for an environment, executable by a processor to:
- detect, in a plurality of image frames captured by a camera, when a person enters a region of interest;
- track movements of the person in the region of interest by comparing images of the person in the plurality of image frames;
- determine attributes of the person;
- determine environmental contexts for the region of interest;
- determine whether or not an anomalous behavior is detected based on the movements and the attributes of the person and the environmental contexts;
- generate an alert when the anomalous behavior is detected; and
- transmit the generated alert to user device of one or more predetermined recipients via a communications channel of a communications network,
- wherein determining whether or not the anomalous behavior is detected includes determining whether a gait of the person is different from a threshold gait of persons in the region of interest.

* * * * *